(No Model.)

C. MAISEL.
FASTENING DEVICE FOR HAMS, &c.

No. 440,815. Patented Nov. 18, 1890.

Witnesses:
Wm. H. Dopp
Centie S. Stark

Inventor:
Conrad Maisel
by Michael J. Ed. Wm. O. Stark
Attorneys.

UNITED STATES PATENT OFFICE.

CONRAD MAISEL, OF BUFFALO, NEW YORK.

FASTENING DEVICE FOR HAMS, &c.

SPECIFICATION forming part of Letters Patent No. 440,815, dated November 18, 1890.

Application filed September 24, 1890. Serial No. 365,953. (No model.)

*To all whom it may concern:*

Be it known that I, CONRAD MAISEL, of Buffalo, in the county of Erie and State of New York, have invented certain new and useful Improvements on Prepared Hams and Shoulders and Fasteners for the Same; and I do hereby declare that the following description of my said invention, taken in connection with the accompanying sheet of drawings, forms a full, clear, and exact specification, which will enable others skilled in the art to which it appertains to make and use the same.

This invention has general reference to improvements in means for preparing hams and shoulders; and it consists, essentially, in the novel and peculiar combination of parts and details of construction, as hereinafter first fully set forth and described, and then pointed out in the claims.

Figure 1:
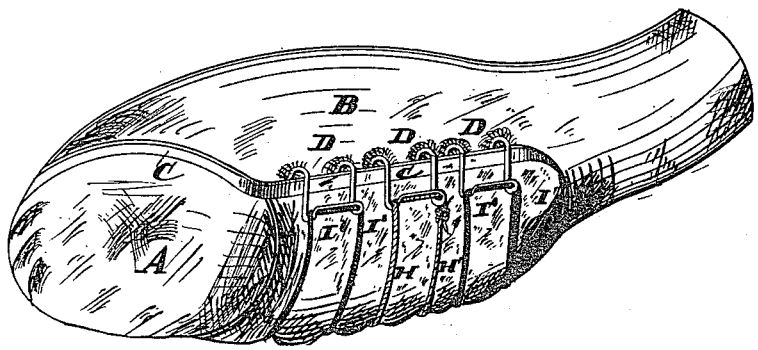
Figure 2:
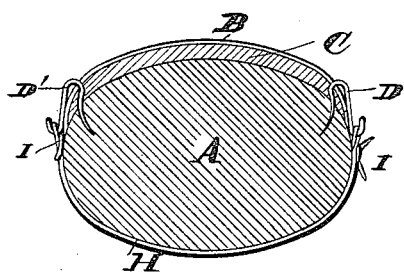
Figure 3:
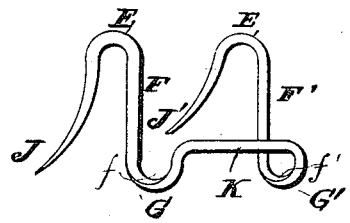

In the drawings already mentioned, which serve to illustrate my said invention more fully, Figure 1 is a perspective view of a ham or shoulder prepared in accordance with my invention. Fig. 2 is a transverse sectional elevation of the same. Fig. 3 is a perspective view of the wire-fastener detached.

Like parts are designated by corresponding letters of reference in all the figures.

The object of this invention is the production of prepared hams and shoulders, in which the strings used for binding the rind to the meat portion of the ham or shoulder and for compressing the same are secured to wire fasteners of peculiar construction, whereby the parts may be more securely tied and bound together and considerable time saved in the preparation of the article. To attain this result, I prepare the hams and shoulders substantially as follows:

A is the lean or meat portion of a ham or shoulder, the bone being removed or not at the option of the manufacturer.

B is the rind, and C the underlying fat. This rind is lifted from the fat, and as much of the latter removed as is desired to suit the requirements of the trade, and then replaced and bound to the lean portion by means of fasteners D and strings H H, Fig. 1, which strings are passed over and attached to said fasteners, as hereinafter to be referred to. Each of the fasteners—one of which is shown in detail in Fig. 3—consists of a wire structure formed from a single piece, having the bends E to produce hooks J J', the ends of which are somewhat pointed, the parallel middle portions F F', having the forwardly-turned bends G G', and a horizontal portion K, thereby forming two hooks $f f'$, over which the strings H H' are passed. The portions J J' are inserted into the rind on both of its sides near the edges. Then a string of a length to reach at least twice over the lean portion is doubled and hung upon one of the fasteners over the hooks $f f'$, and then passed over the lean portion to the opposite fastener, where the string is passed over the said hooks $f f'$, and then knotted after the string has been tightly pulled, thereby securely binding the rind to the lean portion and compressing the whole into a comparatively solid body. Several of the fasteners are used on each side of the ham or shoulder and knotted alternately on opposite sides, or on one side, if preferred.

By the adoption of the fastener hereinbefore described I am enabled to save considerable time in knotting and tying, since I have but two knots to tie for each double string, which in establishments preparing a large number of hams and shoulders is quite an item. I also save time in cutting the strings. If desired, the said string may be fastened to the hook of the fasteners and then brought successively over all the hooks—lace-fashion, as it were—without departing from my invention.

Instead of using strings for securing the parts together, I may, and, in fact, prefer to use, rubber endless elastic bands I' to secure the rind to the lean portion and compressing the parts, which bands will be hung over the hooks $f f'$ on one side of the rind and then pulled over the lean portion and snapped over the hooks $f f'$ on the opposite side of the rind. The application of these elastic bands forms an essential feature, inasmuch as they avoid one difficulty which is sometimes experienced in using strings—viz., that in course of time, should the meat shrink, they become loose—while the rubber bands have a tendency of continually pulling the parts into closer contact. These bands will not affect the meat in any manner, and they are cheap enough to be a perfect substitute for the strings, especially so since they are quickly applied and occupy much less time in their application than the use of the strings.

The fasteners are preferably produced from tinned wire, though I have found that corrosion of the bare metal will not take place, owing to the fact that the fat acts as a neutralizer of the effects of the salt contained in the meat upon the metal of the fasteners.

Having thus fully described my invention, I claim as new and desire to secure to me by Letters Patent of the United States—

1. The combination, with the ham or shoulder, of a series of wire fasteners inserted into the rind on both sides thereof, and the fastening strings or bands secured to one of the fasteners and hooked over the opposite fastener, said fasteners consisting each of two pointed hooks, the parallel portions, the lower bends, and the connecting portion, as and for the object stated.

2. The improved fastener hereinbefore described, consisting of a single piece of wire formed into two pointed hooks, two parallel portions, two lower bends forming hooks, and the connecting portion, said fastener being adapted for use in conjunction with a string or rubber band for securing the rind to the meat portion, as set forth.

In testimony that I claim the foregoing as my invention I have hereto set my hand in the presence of two subscribing witnesses.

CONRAD MAISEL.

Attest:
MICHAEL J. STARK,
WM. O. STARK.